(12) United States Patent
Kim et al.

(10) Patent No.: US 10,721,160 B2
(45) Date of Patent: Jul. 21, 2020

(54) METHOD OF DISTRIBUTING DATA AND DEVICE SUPPORTING THE SAME

(71) Applicant: SAMSUNG ELECTRONICS CO., LTD., Suwon-si (KR)

(72) Inventors: Jong-ryool Kim, Suwon-si (KR); Hyo-taek Shim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1051 days.

(21) Appl. No.: 14/713,437

(22) Filed: May 15, 2015

(65) Prior Publication Data

US 2015/0334008 A1 Nov. 19, 2015

Related U.S. Application Data

(60) Provisional application No. 61/993,410, filed on May 15, 2014, provisional application No. 61/993,437, filed on May 15, 2014.

(30) Foreign Application Priority Data

Mar. 13, 2015 (KR) .................. 10-2015-0035225

(51) Int. Cl.
*G06F 15/173* (2006.01)
*H04L 12/721* (2013.01)
(Continued)

(52) U.S. Cl.
CPC .......... *H04L 45/34* (2013.01); *H04L 12/6418* (2013.01); *H04L 47/50* (2013.01)

(58) Field of Classification Search
CPC ...... H04L 45/34; H04L 12/6418; H04L 47/50
(Continued)

(56) References Cited

U.S. PATENT DOCUMENTS

| 8,612,611 B2 | 12/2013 | Morimoto |
| 2003/0081615 A1 | 5/2003 | Kohn et al. |

(Continued)

FOREIGN PATENT DOCUMENTS

| JP | WO2011/096307 A1 | 8/2011 |
| KR | 10-1019251 B1 | 3/2011 |
| WO | 0178309 A2 | 10/2001 |

OTHER PUBLICATIONS

Rajesh Nishtala et al.; "Scaling Memcache at Facebook"; USENIX Association; 10th USENIX Symposium on Networked Systems Design and Implementation (NSDI'13); 2013; pp. 385-398.

(Continued)

*Primary Examiner* — Vivek Srivastava
*Assistant Examiner* — Karina J Garcia-Ching
(74) *Attorney, Agent, or Firm* — Sughrue Mion, PLLC

(57) ABSTRACT

A method of distributing data by a device. The method includes determining a core of a network interface card from multiple cores existing in a server and determining a queue of a network interface card for processing data transmitted from the device. The method further includes determining a sources port of the device for transmitting data to the determined core or the determined queue of the network interface card, by using an inverse-hash function of a hash function that is used by the server. The method also includes transmitting the data to the server, via the determined source port.

22 Claims, 10 Drawing Sheets

(51) Int. Cl.
*H04L 12/64* (2006.01)
*H04L 12/863* (2013.01)

(58) Field of Classification Search
USPC .......................................................... 709/238
See application file for complete search history.

(56) References Cited

U.S. PATENT DOCUMENTS

| | | | |
|---|---|---|---|
| 2004/0013112 A1 | 1/2004 | Goldberg et al. | |
| 2006/0195698 A1 | 8/2006 | Pinkerton et al. | |
| 2010/0287227 A1* | 11/2010 | Goel | H04L 67/1002 709/202 |
| 2011/0267950 A1* | 11/2011 | Solomon | H04L 45/04 370/235 |
| 2012/0131205 A1 | 5/2012 | Pyatkovskiy | |
| 2012/0170575 A1* | 7/2012 | Mehra | H04L 41/00 370/359 |
| 2012/0189013 A1 | 7/2012 | Goglin et al. | |
| 2012/0233349 A1* | 9/2012 | Aybay | H04L 47/2441 709/234 |
| 2014/0019982 A1 | 1/2014 | John et al. | |
| 2014/0082175 A1 | 3/2014 | Nadathur et al. | |

OTHER PUBLICATIONS

Hyeontaek Lim et al; "MICA: A Holistic Approach to Fast In-Memory Key-Value Storage"; USENIX: The Advanced Computing Systems Association; 11th USENIX Symposium on Networked Systems Design and Implementation (NSDI'14); Apr. 2-4, 2014; 17 pages total.

Daniel Waddington et al.; "KV-Cache: A Scalable High-Performance Web-Object Cache for Manycore"; IEEE Computer Society; 2013 IEEE/ACM 6th International Conference on Utility and Cloud Computing; 2013; pp. 123-130.

Alex Wiggins et al.; "Enhancing the Scalability of Memcached"; Intel Corporation; May 17, 2012; 34 pages total.

Jongryool Kim et al.; "Multi-Core Aware Flexible Network Stack for High Performance Network I/O"; Samsung Electronics; 2014; pp. 1-2.

Jongryool Kim et al.; "SIOT: Scalable packet processing for Internet of Things"; Samsung Electronics; 2014; pp. 1-7.

Communication dated Aug. 13, 2015, issued by the International Searching Authority in counterpart International Application No. PCT/KR2015/004888 (PCT/ISA/210 & PCT/ISA/237).

Communication dated Nov. 20, 2017, from the European Patent Office in counterpart European Application No. 15792877.1.

Anonymous, Linux/Documentation/networking/scaling.txt, Linux Cross Reference, Free Electrons, Embedded Linux Experts, Linux, Sep. 2, 2013 (Sep. 2, 2013), pp. 1-8, XP055312131,(8 Pages Total) Retrieved from the Internet: URL:http://lxr.free-electrons.com/source/Documentation/networking/scaling.txt?v=3.11.

\* cited by examiner

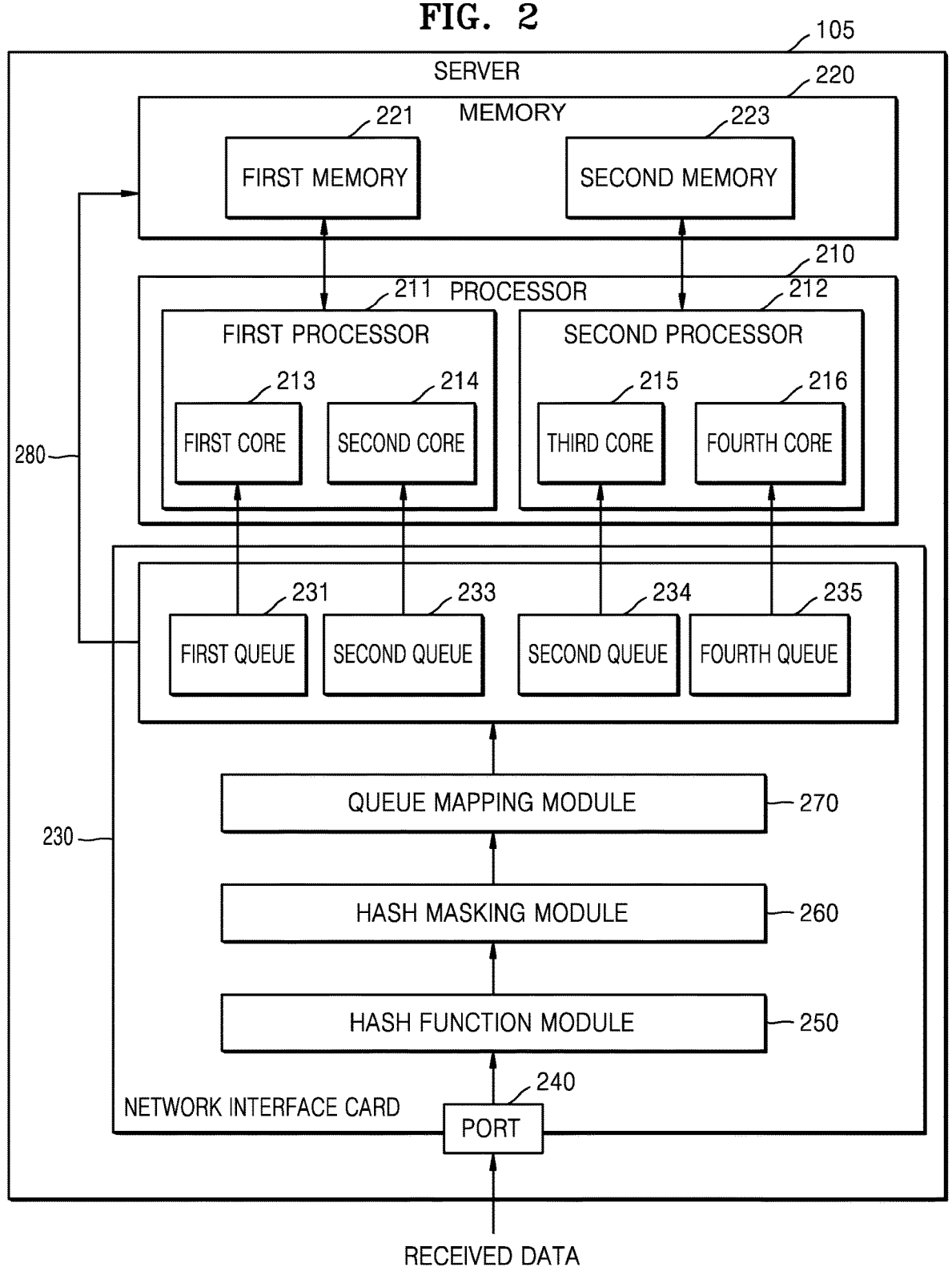

FIG. 3A $$K = \begin{Bmatrix} a & b & c & d & e & \cdots \\ b & c & d & e & f & \cdots \\ c & d & e & f & g & \cdots \\ \vdots & \vdots & & & & \end{Bmatrix}$$

METHOD OF DISTRIBUTING DATA AND DEVICE SUPPORTING THE SAME

CROSS-REFERENCE TO RELATED APPLICATIONS

This application claims the benefit of U.S. Provisional Application Nos. 61/993,410 and 61/993,437 filed on May 15, 2014, in the United States Patent and Trademark Office, and claims priority from Korean Patent Application No. 10-2015-0035225 filed on Mar. 13, 2015 in the Korean Patent Office, the disclosures of which are incorporated herein by reference in their entireties.

BACKGROUND

1. Field

An apparatus and a method consistent with one or more exemplary embodiments broadly relate to a method of distributing data and a device supporting the same.

2. Description of the Related Art

As information communication technology advances, a number of devices and a number of services increase. Thus, various services are provided to devices. Additionally, data throughputs, which need to be processed by a server to provide various services, drastically increase. Accordingly, a method of efficiently storing data and processing pieces of data at the same time, which is performed by a server providing a service, is being developed.

Technology of processing data by using multi-processors or multi-cores is employed as a technology for processing pieces of data at the same time. The technology of processing data by using multi-processors or multi-cores may process pieces of data in parallel with each other by simultaneously executing programs through a plurality of processes or threads. Recently, technology of selecting a specific processor or a specific core, which is appropriate for processing a key requested by a user device, is being researched and developed.

SUMMARY

In related art, information about a specific core is added to a payload area of a packet that is transmitted from a user device, so that a specific core in a server may process a key requested by the user device. However, in this case, since the information about the specific core is added to the payload area of the packet, the payload area may be wasted.

Additionally, in the related art, the server employs a driver of a specific network interface card (NIC) so as to recognize specific core information added to the payload area. Accordingly, since the network interface card is used only for recognizing a specific data packet, general usability of the network interface card may not be ensured.

According to one or more exemplary embodiments, a method of distributing data for supporting processing data requested by a user device by using information included in a header area of a data packet, so that a specific core included in a server may process the data requested by the user device, is provided and a device supporting the same.

Additional aspects will be set forth in part in the detailed description of exemplary embodiment which follows and, in part, will be apparent from the detailed description of exemplary embodiments, or may be learned by practice of exemplary embodiments.

Illustrative, non-limiting embodiments may overcome the above disadvantages and other disadvantages not described above. An inventive concept is not necessarily required to overcome any of the disadvantages described above, and illustrative, non-limiting embodiments may not overcome any of the problems described above. The appended claims should be consulted to ascertain the true scope of an inventive concept.

According to an aspect of one or more exemplary embodiments, a method of distributing data includes: determining one or more of a core and a queue corresponding to the core of a network interface card which is configured to process data transmitted from a device, from among a plurality of cores in a computer; determining a source port of the device for transmitting data to the determined one or more of the core or the queue of the network interface card, by using an inverse-hash function of a hash function that is used by the computer; and transmitting the data to the computer, via the determined source port.

The determining of the source port may include: calculating a hash value; and determining a source port number of the source port, based on the calculated hash value, a destination internet protocol (IP) number, a destination port number, and a source IP number.

The hash value may consist of a value mapped with the determined queue dedicated to the determined core, from among the corresponding plurality of queues of the network interface included in the computer, and an arbitrary value.

The determining the source port number may include determining the source port number by performing an exclusive or (XOR) operation between the calculated hash value, the destination IP number, the destination port number, and the source IP number, by using the inverse-hash function.

The determining the source port number may include determining the source port number by performing an XOR operation between values corresponding to upper 16 bits of the source IP number, values corresponding to lower 16 bits of the source IP number, values corresponding to upper 16 bits of the destination IP number, values corresponding to lower 16 bits of the destination IP number, and the destination port number of 16 bits, by using the inverse-hash function.

The transmitting the data to the server may include inserting a destination IP number, a destination port number, a source IP number, and a source port number into a header of a data packet.

The hash function may be a Toeplitz hash function, and a linear independent matrix.

A factor included in a row of the matrix may be shifted at an interval of one or more bits, as a number of the row in the matrix is increased.

According to another aspect of one or more exemplary embodiments, a method of distributing data includes: receiving data in a packet from a device; calculating a hash value by using a hash function, based on information included in a header of the received packet; masking the hash value; and determining a queue dedicated to a core that is to process the received data, from among a plurality of queues included in a network interface card, based on the masked hash value.

The information included in the header may include a destination internet protocol (IP) number, a destination port number, a source IP number, and a source port number of the device.

The calculating the hash value may include calculating the hash value by performing an exclusive or (XOR) operation between the destination IP number, the destination port number, the source IP number, and the source port number, by using the hash function.

The determining the queue dedicated to the core may include: calculating a value obtained in a portion of the masked hash value; and determining the queue mapped with the calculated value by using an indirection table.

The method may further include: transmitting the received data to the determined queue; transmitting an interrupt to the determined core, in response to the received data being transmitted to the determined queue; and transmitting the received data to a memory connected to a processor that includes the determined core.

According to yet another aspect of one or more exemplary embodiments, a device includes: a network interface card configured to receive and transmit data; and a processor configured to process the received data, wherein the processor is further configured to determine a destination core and a corresponding queue of a destination network interface card which processes the data transmitted from the device, from among a plurality of cores in a destination server, determines a source port of the device which transmits the data to the determined core or queue of the destination network interface card, by using an inverse-hash function of a hash function that is used by the server, and control a transmission of the data to the server via the determined source port.

According to yet another aspect of one or more exemplary embodiments, a server includes: a plurality of cores configured to process data; and a network interface card configured to receive the data in a packet from a device, wherein the network interface card is further configured to calculate a hash value by using a hash function, based on information included in a header of the received packet, mask the hash value; and determine a queue dedicated to a core, from among the plurality of cores, that is to process the received data, from among a plurality of queues included in the network interface card, based on the masked hash value.

BRIEF DESCRIPTION OF THE DRAWINGS

These and/or other aspects of exemplary embodiments will become apparent and more readily appreciated from the following description of exemplary embodiments, taken in conjunction with the accompanying drawings in which:

FIG. 2 is a block diagram illustrating a server according to an exemplary embodiment;

FIGS. 3A, 3B, and 3C are views illustrating a technique for determining a queue for storing data according to an exemplary embodiment;

DETAILED DESCRIPTION OF EXEMPLARY EMBODIMENTS

Figure 1:
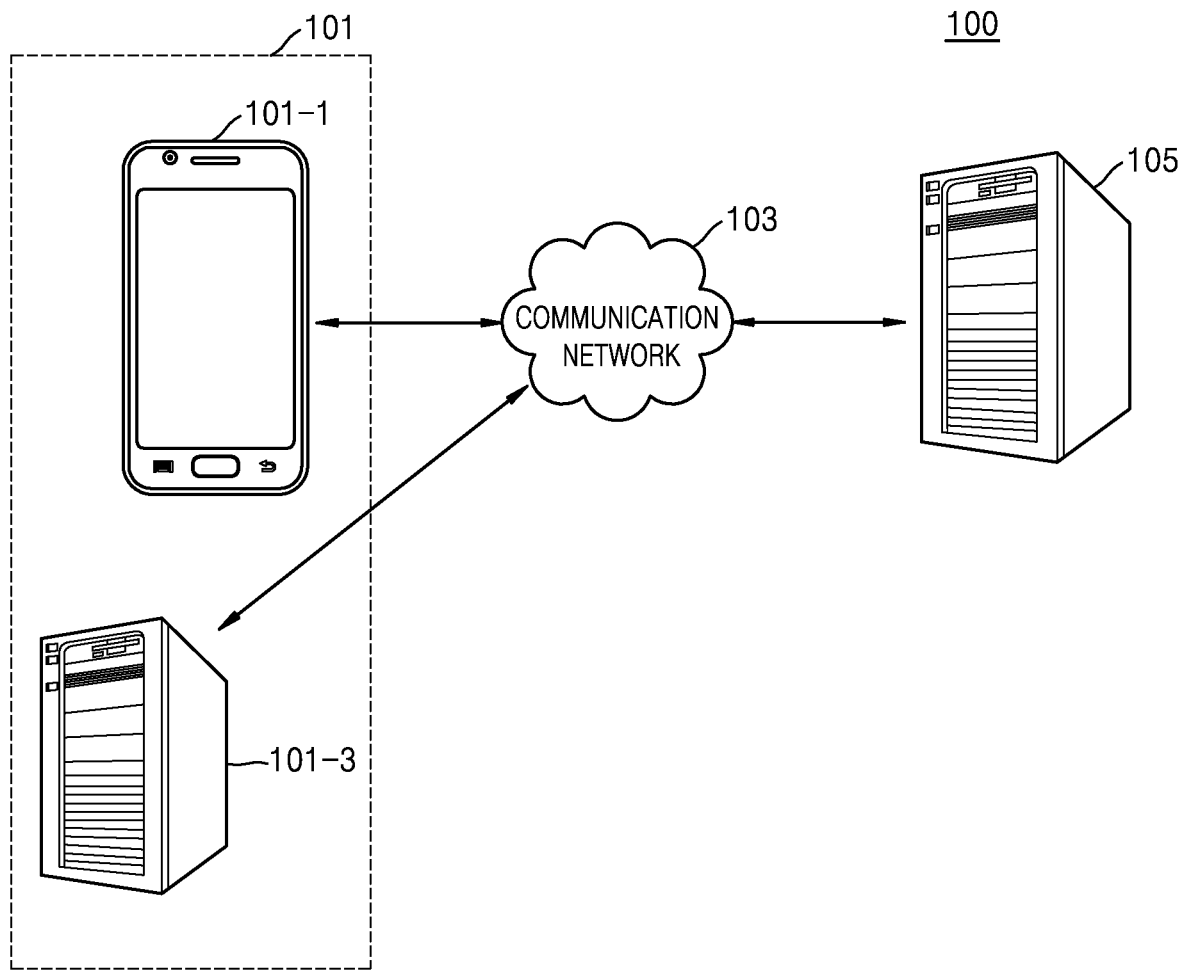
FIG. 1 is a block diagram illustrating a system of distributing data according to an exemplary embodiment.

Reference will now be made in detail to exemplary embodiments, which are illustrated in the accompanying drawings, where like reference numerals refer to like elements throughout. In this regard, exemplary embodiments may have different forms and should not be construed as being limited to the descriptions set forth herein. Accordingly, exemplary embodiments are described below, by referring to the figures, merely for the purpose of explaining aspects of the present disclosure and should not be construed as being limiting of an inventive concept. As used herein, the term "and/or" includes any and all combinations of one or more of the associated listed items. Expressions such as "at least one of," when preceding a list of elements, modify the entire list of elements and do not modify the individual elements of the list.

One or more of exemplary embodiments relate to a system, a method, and a device for distributing data. In the following description of exemplary embodiments, functions or constructions are not described in detail if it is determined that they are well known to those of ordinary skilled in the art.

FIG. 1 is a block diagram illustrating a system 100 of distributing data according to various exemplary embodiments.

Referring to FIG. 1, the system 100 for distributing data may include a device 101 such as a device 101-1 and a device 101-3, a communication network 103, and a server 105, according to an exemplary embodiment.

The device 101 requests data from the server 105 via the communication network 103. The device 101 may include a mobile terminal 101-1 and a server 101-3. According to an exemplary embodiment, the mobile terminal 101-1 is a device that may perform a communication function. For example, the mobile terminal 101-1 may be at least one selected from the group consisting of a smartphone, a tablet personal computer (PC), a mobile phone, a video phone, an e-book reader, a desktop PC, a laptop PC, a notebook computer, a personal digital assistant (PDA), a portable multimedia player (PMP), a moving pictures expert group audio layer 3 (MP3) player, a mobile medical device, a camera, a wearable device (for example, a head-mounted device (HMD) such as electronic glasses), electronic clothes, an electronic bracelet, an electronic necklace, an electronic accessory, an electronic tattoo, and a smart watch. According to an exemplary embodiment, the server 101-3 may include a proxy server, a web server, a cache server, or a database (DB) server. These are provided by way of an example only and not by way of a limitation. The device 101 includes a processor and a memory and may optionally include a display.

According to an exemplary embodiment, if the server 101-3 is a web server, the server 105 may be a cache server or a database (DB) server, which may include multi-core processor.

According to an exemplary embodiment, the device 101 may transmit data to a specific core for data processing, from among a plurality of cores (that is, multiple cores) in the server. For example, the device 101 may determine a specific core and a queue of a specific network interface card in the server 105 which are appropriate for processing a key input by a user, and transmit data that includes the key to the determined specific core and the determined queue of the specific network interface card.

According to an exemplary embodiment, the device 101 may determine a source port (or a source port number) of the device 101 for transmitting the data to the specific core and the queue of the specific network interface card. For example, if the data is transmitted to the server 105, the source port number of the device 101 may be used as a variable for determining a specific core in the server 105. For example, the server 105 may determine a queue bound or dedicated to a specific core from among a plurality of queues, based on the source port number of the device 101, a destination internet protocol (IP) number and a destination port (or a port number), and a source IP of the device 101. If the data transmitted from the device 101 is stored in the queue bound or dedicated to the specific core in the server 105, the specific core may process the received data. The device 101 may determine a source port number by performing an operation before transmitting the data to the server 105, so as to store the data in the specific core bound or dedicated to the specific core for data processing.

According to an exemplary embodiment, the device 101 may calculate an inverse function of a hash function employed by the server 105, that is, an inverse-hash function and determine a source port corresponding to the specific core and the queue of the specific network interface card by using the calculated inverse function of the hash function. For example, the device 101 may determine a source port for transmitting data by using an inverse-hash function, based on a destination IP number and a destination port (or a port number) of the server 105 that is to receive data, and a source IP number for transmitting the data, and a hash value corresponding to a queue bound to the specific core that is to process data.

According to an exemplary embodiment, the hash function may be a Toeplitz hash function.

According to an exemplary embodiment, the Toeplitz hash function may be in the form of a linear independent matrix.

According to an exemplary embodiment, an inverse function of the Toeplitz hash function (that is, an inverse-Toeplitz hash function) which is employed by the device 101 may be identical to an inverse function of the Toeplitz hash function which is employed by the server 105.

According to an exemplary embodiment, the device 101 may combine values mapped with a queue in the server 105 with arbitrary values, and thus, calculate a hash value having values of some bits of the hash value identical to values of some bits in a hash value that is to be calculated by the server 105, where the bits of identical value in the calculated hash value are bits that are mapped with the queue.

For example, if a hash value consists of values of 16 bits, and values mapped with a queue in the server 105 includes specific values of 3 bits in a designated bit location in the 16-bit hash value, a hash value calculated by the device 101 may consist of values of 16 bits which include values of 3 bits in a designated bit location and arbitrary values of 13 bits in a remaining bit location. According to an exemplary embodiment, values of 3 bits in a designated bit location in a hash value calculated by the server 105 may be identical to values of 3 bits in a designated bit location in a hash value calculated by the device 101. Values of 13 bits in the hash value calculated by the server 105, other than in the designated bit location, may be identical to or different from values of 13 bits in the remaining bit location in the hash value calculated by the device 101.

According to an exemplary embodiment, a bit location of values mapped with a queue in the server 105, in the hash value, may vary according to settings. According to an exemplary embodiment, a bit location in which values, which are included in the hash value calculated by the device 101 and mapped with a queue, are designated and a bit location in which values, which are included in the hash value calculated by the server 105 and mapped with a queue, are designated may be identical to each other in whole bits of both hash values. For example, if a hash value has a bit range of 16 bits, a bit location in which values, which are included in the hash value calculated by the device 101 and mapped with a queue, are designated and a bit location in which values, which are included in the hash value and mapped with a queue, are designated may correspond respectively to a bit location ranged from a lower $7^{th}$ bit through $5^{th}$ bit from among the bit range of 16 bits.

According to an exemplary embodiment, a bit range of value mapped with a queue in the server 105 may be determined according to a number of queues. For example, if 8 queues are present in the server 105, a range of 3 bits which may distinguish 8 queues from each other may be determined as a bit range. As another example, if 16 queues are present in the server 150, a range of 4 bits which may distinguish 16 queues from each other may be determined as a bit range.

According to an exemplary embodiment, the device 101 may determine a source port number for transmitting data to the server 105 by using an inverse-hash function and an exclusive or (XOR) operation among a destination IP number, a destination port number, and a source IP number. An operation for determining a source port of the device 101 for transmitting data to the server 105 according to an exemplary embodiment is described below with reference to FIG. 2.

According to an exemplary embodiment, the device 101 may generate a data packet that is to be transmitted to the server 105, by inserting the destination IP number, the destination port number, the source IP number, and the source port number into a header area and inserting a value of the key into a payload area. The device 101 may transmit the generated data packet to the server 105 via the communication network 103.

The communication network 103 may mediate data transmission between the device 101 and the server 105. The communication network 103 may be configured to use a wired or wireless communication method. For example, the communication network may include a World Wide Web (internet) communication network 130, a wireless local area network (WLAN) communication network 130, a code division multiple access (CDMA) communication network 130, a wideband CDMA (WCDMA) communication network 130, or a global system for mobile communication (GSM) communication network 103, according to an exemplary embodiment. These networks are provided by way of an example only and not by way a limitation and a number of networks may be provided.

The server 105 may transmit data, received from the device 101, to a specific queue from among a plurality of queues in the network interface card, based on the header information of the received data. For example, the server 105 may transmit the received data to a specific queue from among a plurality of queues, based on a destination IP number, a destination port number, a source IP number, and a source port number which are included in a header area of a data packet received from the device 101.

According to an exemplary embodiment, the server 105 may calculate a hash value by applying a hash function to the destination IP number, the destination port number, the source IP number, and the source port number.

According to an exemplary embodiment, the hash function may be a Toeplitz hash function.

According to an exemplary embodiment, the Toeplitz hash function may be a linear independent matrix.

The server 105 may mask the calculated hash value. The server 105 may determine a queue corresponding to the masked hash value through a search in an indirection table.

According to an exemplary embodiment, the indirection table may be a table in which queue numbers mapped with each hash entry, calculated based on the masked hash value, are stored.

According to an exemplary embodiment, the server 105 may transmit data to a queue mapped with the masked hash value. For example, the server 105 may transmit data to a queue determined through a search in the indirection table, from among a plurality of queues in the network interface card included in the server 105.

According to an exemplary embodiment, if the data is transmitted to the mapped queue, the server 105 may copy stored data to a memory connected to a specific core. The server 105 may transmit an interrupt to a specific core bound or dedicated to the mapped queue. The core which has received the interrupt may process data that includes a key, by retrieving it from a memory to which the data is copied.

According to an exemplary embodiment, the server 105 may communicatively connect to the device 101, by using a transmission control protocol (TCP) listen socket that operates on a thread of a particular core. For example, the server 105 may receive a synchronization (SYN) packet from the device 101 (for example, a TCP socket of the device 101) so as to communicatively connect to the device 101. The server 105 may transmit the SYN packet to a queue corresponding to the particular core, from among a plurality of queues, based on a destination IP number, a destination port number, a source IP number, and a source port number which are included in a header area of the SYN packet. The server 105 may copy the SYN packet, transmitted to the queue, to a memory, and transmit an interrupt to a particular core bound to the queue. The particular core which has received the interrupt may transmit the SYN packet to the TCP listen socket that operates on the thread of the particular core, by using a hash function. According to an exemplary embodiment, a hash function used by the particular core to transmit the SYN packet to the TCP listen socket may be identical to a hash function used to transmit a data packet, received from the device 101, to a particular queue. For example, a hash function used by the particular core may be a Toeplitz hash function used to determine a particular queue. According to an exemplary embodiment, the hash function used by the particular core may determine a TCP listen socket based on variables identical to variables used to determine a particular queue. For example, the hash function used by the particular core may determine a TCP listen socket, based on variables such as a destination IP number, a destination port number, a source IP number, and a source port number which are received from the device 101.

According to an exemplary embodiment, when the SYN packet is transmitted to the TCP listen socket, the server 105 may transmit a SYN acknowledgement (ACK) packet to the device 101. For example, the server 105 may transmit a SYN ACK packet, which indicates that the SYN packet is transmitted to the TCP listen socket that operates on the thread of the particular core, to the device 101.

According to an exemplary embodiment, the server 105 may receive an ACK packet from the device 101 via a path identical to a path via which the server 105 received the SYN packet. For example, the server 105 may transmit the received ACK packet to the particular queue by using a hash function (for example, a Toeplitz hash function), and transmit an interrupt to the particular core. The particular core may transmit the ACK packet to the TCP listen socket, which operates on the thread of the particular core and to which the SYN packet is received, by using the hash function. When the ACK packet is transmitted to the TCP listen socket, the TCP listen socket may generate a TCP socket, and thus, a session between the server 105 and the device 101 may be set.

According to an exemplary embodiment, in a process of setting the session between the server 105 and the device 101, a REUSERPORT option may be used as a kernel option for the TCP listen socket.

FIG. 2 is a block diagram illustrating a server according to an exemplary embodiment.

Figure 3B:
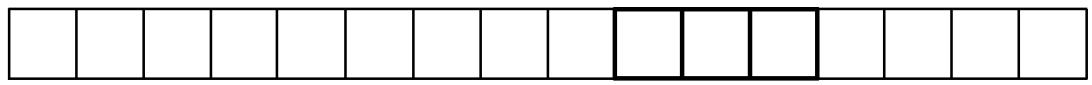
Figure 3C:
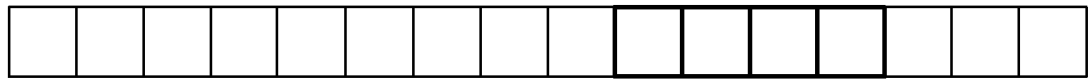

FIGS. 3A-C are views illustrating a technique of determining for a queue, to which data is to be transmitted, according to an exemplary embodiment.

Referring to FIGS. 2 and 3A-C, the server 105 may include a processor 210, a memory 220, and a network interface card 230, according to an exemplary embodiment.

According to an exemplary embodiment, the server 105 may be a web server or a web application server.

According to another exemplary embodiment, the server 105 may be a cache server or a DB server.

However, the server 105 is not limited thereto and is provided by way of an example only, and may be any device that may process data requested from the outside.

According to an exemplary embodiment, the processor 210 may include a plurality of processors (e.g. first and second processors 211 and 212). FIG. 2 shows that the processor 210 includes two processors, but the processor 210 is not limited thereto but is provided by way of an example only. Each of the plurality of processors may include a plurality of cores. For example, the first processor 211 may include a first core 213 and a second core 214, and the second processor 212 may include a third core 215 and a fourth core 216. FIG. 2 shows that each of the plurality of processors 211 and 212 respectively includes two cores, but the plurality of processors 211 and 212 are not limited thereto but is provided by way of an example only. For example, each of the plurality of processors 211 and 212 may include one core, or three or more cores. Also, according to an exemplary embodiment, a number of cores in each processor may vary from each other.

According to an exemplary embodiment, each of the first through fourth cores 213 through 216 may be bound (or connected or dedicated) to each of a plurality of first through fourth queues 231, 233, 234, and 235. Each of the plurality of cores 213 through 216 may be bound or dedicated to each of the queues 231, 233, 234, and 235 included in the network interface card 230, so as to satisfy application-level core affinity. If data, transmitted by the device 101, is transmitted to (or stored in) the plurality of cores 213 through 216, each of the plurality of cores 213 through 216 may receive an interrupt from the bound or dedicated queue.

According to an exemplary embodiment, a specific core that has received the interrupt from the bound or dedicated queue, from among the plurality of cores 213 through 216, may inquire data (or a value of a key) in the memory connected to a processor that includes the specific core. The specific core may process a request from the device 101, based on the inquired data or based on the obtained value of the key.

According to an exemplary embodiment, each of the plurality of queues 231, 233, 234, and 235 may include at least one TCP listen socket that operates on a thread. For example, each of the plurality of cores 231, 233, 234, and 235 may communicatively connect to the device 101 via at least one TCP listen socket. If a SYN packet or an ACK packet is received from the device 101, each of the plurality of cores 231, 233, 234, and 235 may transmit the SYN packet or the ACK packet to a particular TCP listen socket, based on a destination IP number, a destination port number, a source IP number, and a source port number which are included in the SYN packet or the ACK packet. According to an exemplary embodiment, each of the plurality of queues 231, 233, 234, and 235 may include a hash function module, a hash masking module, and a queue mapping module. For example, the hash function module may be a Toeplitz hash function identical to a hash function used to determine a queue. Each of the plurality of queues 231, 233, 234, and 235 may determine a particular TCP listen socket, by using a value that is output by using the hash function module, the hash masking module, or the queue mapping module. Each of the plurality of queues 231, 233, 234, and 235 may transmit the ACK packet to the particular TCP listen socket and the particular TCP listen socket may generate a TCP socket, and thus, a session between the server 105 and the device 101 may be set.

According to an exemplary embodiment, when each of the plurality of queues 231, 233, 234, and 235 receives the SYN packet, each of the plurality of queues 231, 233, 234, and 235 may control transmitting a SYN ACK packet to the device 101.

FIG. 2 is a block diagram illustrating that the plurality of cores 213 through 216 is bound or dedicated respectively to the plurality of queues 231 through 235, according to an exemplary embodiment. However, exemplary embodiments are not limited thereto and are provided by way of an example only. For example, a number of the plurality of cores 213 through 216 connected to the plurality of queues 231 and 233 through 235 may be different from a number of the plurality of cores 213 through 216. For example, one core may be bound or provided with two dedicated queues. As another example, a plurality of cores may be bound to one queue.

According to an exemplary embodiment, the memory 220 stores data. For example, the memory 220 may include a plurality of memories 221 and 223 which are distinguished from each other according to a range of a key value.

According to an exemplary embodiment, the plurality of memories 221 and 223 distinguished from each other according to a range of a key value may be respectively connected to the plurality of processors 211 and 212. For example, the first processor 211 may be connected to the first memory 221 to obtain only data stored in the first memory 211, and the second processor 212 may be connected to the second memory 223 to obtain only data stored in the second memory 223. In various exemplary embodiments, each memory may be physically or logically partitioned to be dedicated to a particular core, a particular processor or a predetermined number of processors selected from a large pool of processors.

According to an exemplary embodiment, the memory 220 may be at least one selected from the group consisting of a cache memory, a random access memory (RAM), and a flash memory.

According to an exemplary embodiment, if the device 101 transmits data to a queue corresponding to each of the plurality of memories 221 and 223, each of the plurality of memories 211 and 223 may receive the data via the queue corresponding to each of the plurality of memories 221 and 223 by using a direct memory access method depicted in FIG. 2 by way of an example with an arrow 280, and store the data.

According to an exemplary embodiment, if the data is received from the device 101, the network interface card 230 may transmit the received data to a specific queue from among the plurality of queues 231, 233, 234, and 235, based on the header information. According to an exemplary embodiment, the network interface card 230 may be a network interface or an adaptor which may communicate with at least one data network.

According to an exemplary embodiment, the network interface card 230 may include a hash function module 250, a hash masking module 260, and a queue mapping module 260.

According to an exemplary embodiment, if the data is received from the device 101 via a network interface card port 240, the hash function module 250 may calculate an input value based on a destination IP number, a destination port number, a source IP number, and a source port number which are included in the received data. For example, the hash function module 250 may calculate an input value by performing an XOR operation and a right-shift operation between a 32-bit destination IP, a 32-bit source IP, a 16-bit destination port number, and a 16-bit source port number as shown in [Equation 1] and [Equation 2] according to an exemplary embodiment.

$$t=\text{source IP}\hat{}\text{dest IP}\hat{}(\text{source port},\text{dest port}), \quad [\text{Equation 1}]$$

where a 'source IP' refers to a source IP number, a 'dest IP' refers to a destination IP number, a 'source port' refers to a source port number, and a 'dest port' refers to a destination port number. Additionally, '(source port, dest port)' refers to a value consisting of a value of a source port in a range from $16^{th}$ to $31^{st}$ bits and a value of a dest port in a range from $0^{th}$ to $15^{th}$ bits. 'A' refers to an XOR operator. t is a calculated 32-bit input value obtained using an exclusive or (XOR) operation.

$$I=\hat{}t(t>>16), \quad [\text{Equation 2}]$$

where '>>' refers to a right-shift operator, '^' refers to an XOR operator. t is a calculated 32-bit input value obtained using an exclusive or (XOR) operation.

A 16-bit input value I may be calculated by using [Equation 1] and [Equation 2] shown above.

According to an exemplary embodiment, a hash function may be expressed in the form of a matrix, as shown in FIG. 3A. According to an exemplary embodiment, the hash function may be a linear independent matrix. For example, a hash function K may include {a, b, c . . . , p} in a first row, {b, c, d . . . , p, a} in a second row, and {c, d, e . . . , a, b} in a third row. In other words, the hash function may be a function in which values included in a row are right-circular shifted in correspondence with 1 bit as a row number is increased. According to an exemplary embodiment, a through p may be an arbitrary value of a binary number '0' or '1'.

According to an exemplary embodiment, the hash function module 250 may calculate a hash value O using Equation 3, shown below, in which a multiplication operation between a hash function K expressed in the form of a matrix such as the one explained above and an input value I, as presented in [Equation 2] are multiplied.

$$O=K\times I \quad [\text{Equation 3}]$$

According to an exemplary embodiment, the masking module 260 may mask the calculated hash value O, as shown in [Equation 4] below:

$$\text{Masked hash value}=O\ \&\ 0x007f \quad [\text{Equation 4}]$$

where '&' refers to a conjunction (or and) operator. '0' refers to a 16-bit value of 0. Upper 8 bits of '0x007f' have a value of 0, and lower 8 bits of '0x007f' refer to a value having a hexadecimal value 7f.

In other words, in an exemplary embodiment, the masking module 260 perform a masking operation for excluding (or masking) a certain part of bits, with respect to the calculated 16-bit hash value O. For example, the server 105 (for example, the network interface card 2304) may extract only a necessary part for calculating an entry mapped with a queue in an indirection table, by performing a conjunction operation (i.e. AND operation) between a certain part of bits of the calculated 16-bit hash value and a binary number '0' and performing a conjunction operation between a certain part of bits which includes information mapped with the queue and a binary number '1'.

According to an exemplary embodiment, the queue mapping module 270 may calculate an entry mapped with a queue in the indirection table, by performing an operation such as [Equation 5] shown below:

An entry mapped with a queue=a masked hash value*a total number of queues>>7 (where '>>7' is an operation for right-shifting in correspondence with 7 bits.) [Equation 5]

Referring to FIG. 3B, if a total number of queues is 8, the queue mapping module 270 may calculate a value corresponding to a bit range of 3 bits ranging from a lower $7^{th}$ bit through a lower $5^{th}$ bit as an entry to be mapped with the queues, according to an exemplary embodiment.

Referring to FIG. 3C, if a total number of queues is 16, the queue mapping module 270 may calculate a value corresponding to a bit range of 4 bits ranging from a lower $7^{th}$ bit through a lower $4^{th}$ bit as a hash entry, according to an exemplary embodiment.

As such, a certain bit range of the calculated hash value O, according to a total number of queues, may be set as a value for determining a queue for processing data, from among a plurality of queues, according to an exemplary embodiment.

According to an exemplary embodiment, the queue mapping module 270 may determine a queue mapped with an entry that is calculated with reference to the indirection table. For example, if an entry is calculated as '011' having a bit range of 3 bits, it may be checked through a search in the indirection table that '011' is mapped with a fourth queue, and thus, the fourth queue may be determined as a queue mapped with the calculated entry (i.e. specific queue).

According to an exemplary embodiment, the indirection table may be a table for storing entries and queues (or queue numbers) mapped with each entry. According to another exemplary embodiment, the indirection table may be a table for storing a queue mapped according to a certain range of a calculated entry.

According to an exemplary embodiment, the queue mapping module 270 may transmit the data transmitted from the device 101 to the determined queue.

According to an exemplary embodiment, if the data is transmitted to the queue, the network interface card 230 may transmit an interrupt to a core bound or dedicated to the queue, and transmit data to a memory connected to a processor that includes the core, to which the interrupt is transmitted, by using a direct memory access method such as the arrow 280 shown in FIG. 2.

Figure 4:
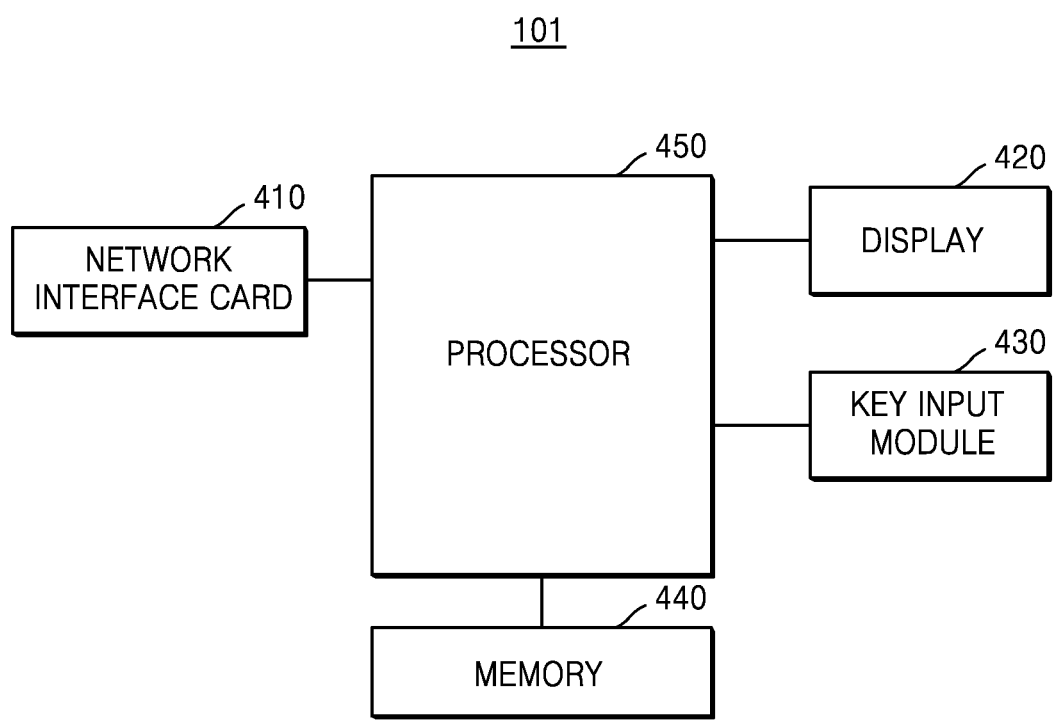
FIG. 4 is a block diagram illustrating a device according to an exemplary embodiment.

FIG. 4 is a block diagram illustrating a device according to an exemplary embodiment.

Referring to FIG. 4, the device 101 may include a network interface card 410, a display 420, a key input module 430, a memory 440, and a processor 450.

According to an exemplary embodiment, the network interface card 410 may transmit or receive data. The network interface card 410 may be a network interface or an adaptor which may communicate with a network.

According to an exemplary embodiment, the display 420 may display data on a screen under the control of the processor 450. For example, if the processor 450 processes (for example, decodes) data and stores the data in a buffer, the display 420 may convert the data stored in the buffer into an analog signal, and display the data on the screen.

According to an exemplary embodiment, the key input module 430 may generate various input signals necessary for operating the device 101. For example, the key input module 430 may be formed of a specific key such as a button key, a side key, or a home key by way of an example and not by way of a limitation. The key input module 430 may be provided in the form of a virtual keyboard so as to support a full touchscreen.

The memory 440 is an auxiliary memory of the processor 450, and may include a disk, a RAM, or a flash memory by way of an example and not by way of a limitation. The memory 440 may store data received from an external device (for example, the server 105) through the network interface card 410, and an operating system (OS) for operating the device 101 under control by the processor 450.

According to an exemplary embodiment, the processor 450 may control operations of the device 101 and a signal flow between internal elements of the device 101, and process data.

According to an exemplary embodiment, if an input is received from a user, the processor 450 may extract a value of a key based on the received input. For example, if an input of searching for specific data is received from a user when a web page is displayed, the processor 450 may extract a value of a key for requesting data search from the server 105.

According to an exemplary embodiment, the processor 450 may determine a core for processing the extracted value of the key, from among the plurality of cores 213 through 216 of the server 105.

According to an exemplary embodiment, if the value of the key for searching for the specific data is extracted and the core of the server 105 for processing the specific data is determined, the processor 450 may calculate an inverse function of a hash function, that is, an inverse-hash function which is employed by the server 105. For example, the processor 450 may calculate an inverse-hash function of a hash function which is in the form of a matrix.

According to an exemplary embodiment, the hash function may be a Toeplitz hash function.

According to an exemplary embodiment, the Toeplitz hash function may be in the form of a linear independent matrix.

According to an exemplary embodiment, the processor 450 may determine a source port for transmitting data by using a destination IP number, a destination port (or a destination port number), a source IP number for transmitting data, and a hash value corresponding to a queue bound to or dedicated to a core of the server 105 which is to process data, or the inverse-hash function.

According to an exemplary embodiment, the processor 450 may calculate a hash value based on an entry mapped with the queue in the server 105 which is to transmit the data. For example, the processor 450 may calculate a hash value in which values in a designated bit range consist of an entry mapped with a queue and values in a remaining bit range consists of arbitrary values. For example, the processor 450 may calculate a hash value in which values in a bit range corresponding to a bit range of an entry mapped with the queue in the hash value O that is to be calculated by the server 105 are identical to the entry mapped with the queue in the hash value O, and whose values in the remaining bit range are arbitrary values.

For example, if 8 queues are present in the server 105 and an entry mapped with queues for storing data in the indirection table is a binary number '011', the processor 450 may calculate a hash value in which values in a bit range where the entry is designated (for example, from a lower $5^{th}$ bit through a lower $7^{th}$ bit in a total range of 16 bits) consist of an entry mapped with the queues and values in a range of upper 9 bits and values in a range of lower 4 bits consist of arbitrary values, as shown in [Equation 6].

$$O'=xxxxxxxxx011xxxx \text{ (where 'x' is a binary number,} \\ \text{and refers to an arbitrary value of '0' or '1'.)} \quad \text{[Equation 6]}$$

According to an exemplary embodiment, if the hash value O calculated by the server 105 is compared to a hash value O' calculated by the device 101, an entry mapped with queues and a location of the entry in an entire bit range in the hash value O are identical to those in the hash value O'. Values in the entire range of the hash value O, other than a range in which the entries are located, may be different from those of the hash value O'. For example, in both the hash value O and the hash value O', an entry is '011' and is located in lower $5^{th}$ through $7^{th}$ bits in the entire range of 16 bits. However, whereas values in the hash value O, other than in a range in which the entry is located, may be calculated as specific values by performing an operation in the server 105, values in the hash value O', other than a range in which the entry is located, may be arbitrary values.

According to an exemplary embodiment, the processor 450 may calculate an input value I' for calculating a source port number, by using the calculated hash value and the inverse-hash function.

$$K^{-1} \times O' = I' \quad \text{[Equation 7]}$$

The processor 450 may calculate the input value I' for calculating a source port number, by performing a multiplication operation between the inverse-hash function and a specific hash value, as shown in [Equation 7].

According to an exemplary embodiment, the processor 450 may determine a source port (or a source port number) for transmitting data based on the calculated input value I', as shown in [Equation 8].

source port=I'^(values in a range of $0^{th}$ to $15^{th}$ bits of a source IP)^(values in a range of $16^{th}$ to $31^{st}$ bits of the source IP)^(values in a range of $0^{th}$ to $15^{th}$ bits of a dest IP)^(values in a range of $16^{th}$ to $31^{st}$ bits of the dest IP)^(a dest port consisting of 16 bits), [Equation 8]

where a 'source IP' refers to a source IP number, a 'dest IP' refers to a destination IP number, a 'source port' refers to a source port number, and a 'dest port' refers to a destination port number. Additionally 'A' refers to an XOR operator.

For example, the processor 450 may calculate a source port number by performing an XOR operation between the calculated input value I', values corresponding to upper 16 bits of the source IP number, values corresponding to lower 16 bits of the source IP number, values corresponding to upper 16 bits of the destination IP number, values corresponding to lower 16 bits of the destination IP number, and a destination port number of 16 bits.

According to an exemplary embodiment, the processor 450 may control the network interface card 410 to transmit data via the determined source port. For example, the processor 450 may insert information about a destination IP number, a source IP number, a destination port number, and a source port number into a header area of a data packet. The processor 450 may insert information about a key requested by a user into a payload area of the data packet. The processor 450 may control the network interface card 410 to transmit the data packet to the server 105 via the determined source port. With reference to FIG. 4, the device 101 is described as being a mobile terminal as an example, but exemplary embodiments are not limited thereto. For example, the device 101 may be a web server, a cache server, a DB server, or a mobile terminal. If the device 101 is a web server, a cache server, or a DB server, some elements of the device 101, for example, a display may not be included in the device 101. As another example, the device 101 may have analogous elements as the server 105 described with reference to FIG. 2.

Figure 5:
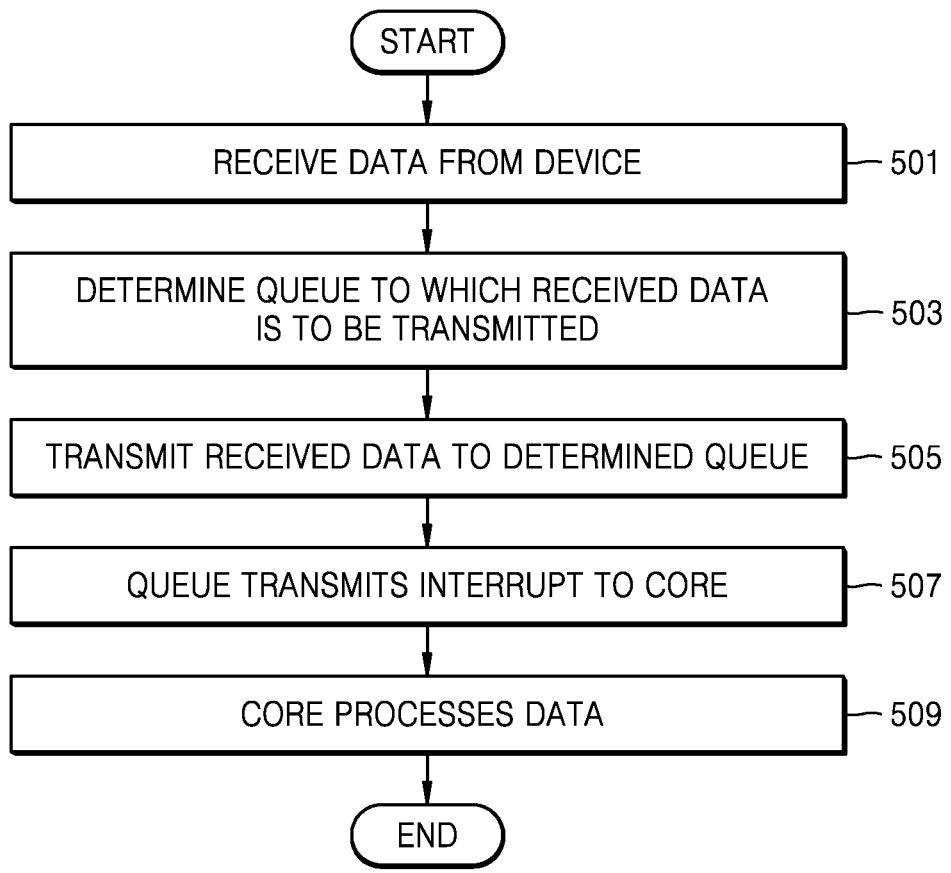
FIG. 5 is a flowchart illustrating a method of distributing data, which is performed by the server, according to an exemplary embodiment.

FIG. 5 is a flowchart illustrating a method of distributing data according to an exemplary embodiment.

In operation 501, the server 105 (for example, the network interface card 410) may receive data from the device 101 via a port 240 of the network interface card 410.

In operation 503, the server 105 (for example, the network interface card 410) may determine a queue to which the received data is to be transmitted (or distributed) from among the plurality of queues 231 through 235, based on header information included in the received data (or a data packet).

Hereinafter, referring to FIG. 6, determining of the queue that is to transmit data to a core, the determining being performed by the server 105, is described.

Figure 6:
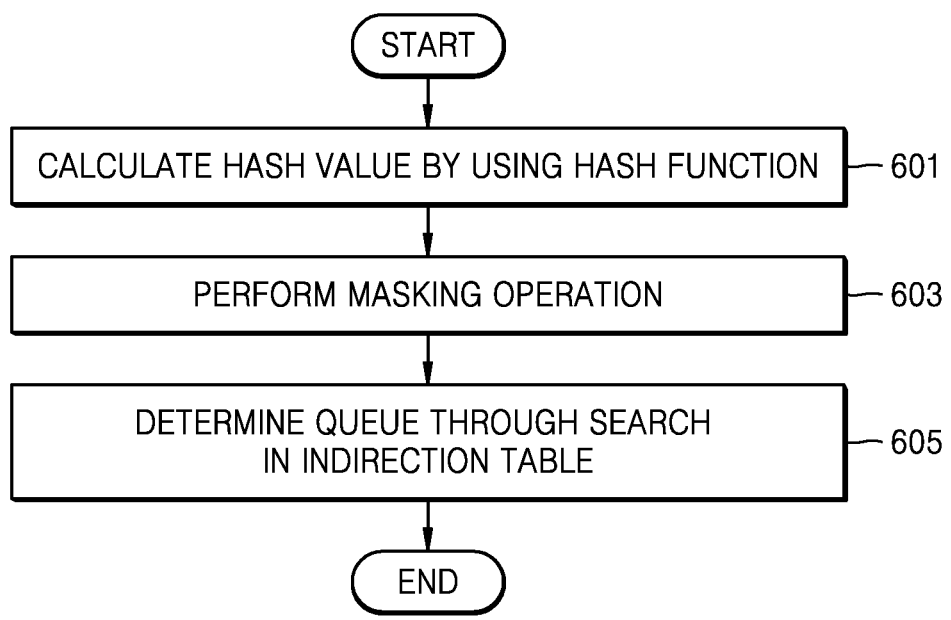
FIG. 6 is a flowchart illustrating a method of determining a queue for transmitting data to a core, which is performed by the server, according to an exemplary embodiment.

FIG. 6 is a flowchart illustrating a method of determining a queue for transmitting data to a core, according to an exemplary embodiment.

Referring to FIG. 6, in operation 601, the server 105 (for example, the network interface card 230) may calculate an input value for applying a hash function, based on a destination IP number, a destination port number, a source IP number, and a source port number which are included in the received header information. For example, the server 105 (for example, the network interface card 230) may calculate an input value for applying a hash function by performing an XOR operation and a right shift operation between a 32-bit destination IP number, a 32-bit source IP number, a 16-bit destination port number, and a 16-bit source port number.

According to an exemplary embodiment, the hash function may be expressed in the form of a matrix. For example, the hash function K may include { a, b, c . . . , p} in a first row, {b, c, d . . . , p, a} in a second row, and {c, d, e . . . , a, b} in a third row. In other words, the hash function may be a function in which values included in a row are right-circular shifted in correspondence with 1 bit as a row number is increased. According to an exemplary embodiment, a through p may be an arbitrary value of a binary number '0' or '1'.

According to an exemplary embodiment, the server 150 (for example, the network interface card 230) may calculate a hash value O by performing a multiplication operation between the hash function K expressed in the form of a matrix and an input value.

According to an exemplary embodiment, in operation 603, the server 105 (for example, the network interface card 230) may perform a masking operation. For example, the server 105 (e.g., the network interface card 230) may extract only a necessary part for calculating an entry mapped with a queue from the indirection table, by performing a conjunction (and) operation between a certain bit part of the calculated 16-bit hash value and a binary number '0' and performing a conjunction (and) operation between a certain bit part which includes information mapped with the queue and a binary number '1'.

According to an exemplary embodiment, in operation 605, the server 105 (for example, the network interface card 230) may determine a queue that is to store data, from among the plurality of queues 231, 233, 234, and 235, by performing a search in the indirection table. For example, the server 105 (for example, the network interface card 230) may calculate an entry mapped with queues, by performing a multiplication operation between a total number of queues and the masked hash value and performing a right-shift operation in correspondence with a designated value. The server 105 (for example, the network interface card 230) may determine a queue which is mapped with a hash entry with reference to an indirection table. For example, if entries are calculated to have a 3-bit value '011' and it is checked that the value '011' is mapped with the queue 4 through a search in the indirection table, the server 105 (for example, the network interface card 230) may determine the queue 4 as a queue mapped with the calculated entry (i.e. the specific queue).

According to an exemplary embodiment, the indirection table may be a table for storing entries and a core (or a core number) mapped with each entry. According to another exemplary embodiment, the indirection table may be a table for storing a queue mapped according to a certain range of a calculated entry.

Referring back to FIG. 5, the server 105 (for example, the network interface card 230) may store the received data in the determined queue.

In operation 507, the server 105 (for example, the network interface card 230) may transmit an interrupt to the core bound to the queue in which the data is stored. The server 105 (for example, the network interface card 230) may transmit the data, transmitted from the device 101, to the memory 220 connected to the core by using a direct memory access method.

In operation 509, the server 105 (for example, a corresponding core) may process the received data based on the received interrupt. For example, the server 105 (for example, the corresponding core) may search for a value of a key via a memory connected to the server 105 (for example, the corresponding core).

Figure 7:
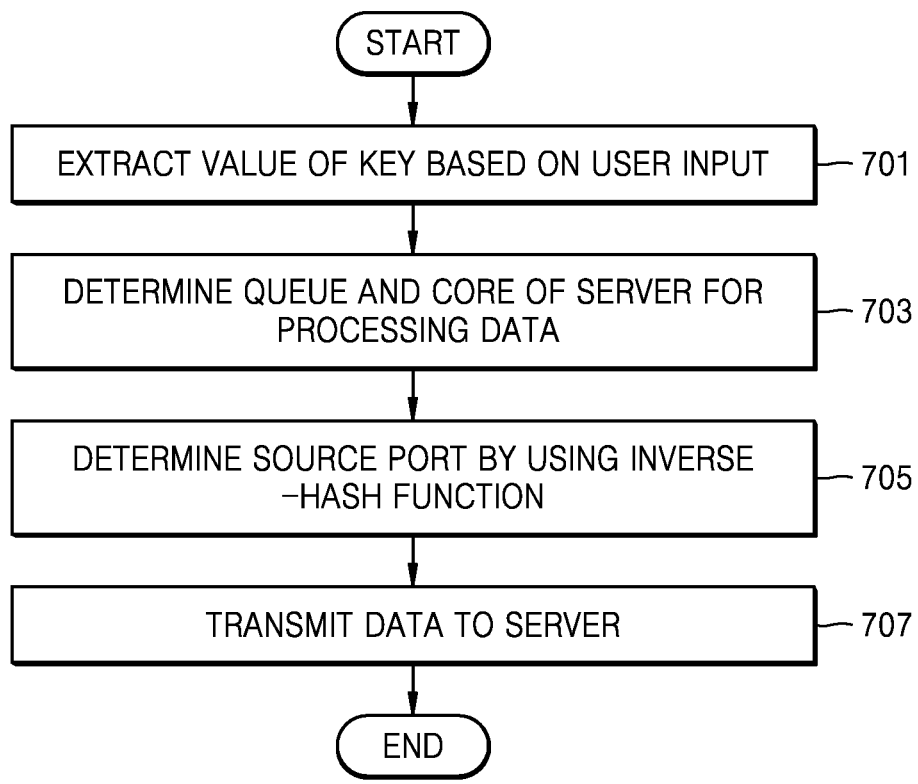
FIG. 7 is a flowchart illustrating a method of distributing data, which is performed by the server, according to an exemplary embodiment.

FIG. 7 is a flowchart illustrating a method of distributing data, according to an exemplary embodiment.

Referring to FIG. 7, in operation 701, the processor 450 may extract a value of a key based on a user input. For example, if an input of searching for specific data is received from a user when a web page is displayed, the processor 450 may extract a value of a key for requesting a data search from the server 105.

In operation 703, the processor 450 may determine a core and a queue for processing the extracted value of the key, from among the plurality of cores 213 through 216 of the server 105.

In operation 705, the processor 450 may determine a source port (or a source port number) for transmitting data that includes the extracted value of the key by using an inverse-hash function.

According to an exemplary embodiment, the processor 450 may calculate an inverse function of a hash function, that is, an inverse-hash function.

According to an exemplary embodiment, the hash function may be a Toeplitz hash function.

According to an exemplary embodiment, the Toeplitz hash function may be in the form of a linear independent matrix.

According to an exemplary embodiment, the processor 450 may determine a source port for transmitting data to the server 105, by using a destination IP number and a destination port (or a port number) of the server 105 to which the data is to be transmitted, a source IP number for transmitting data, and a hash value corresponding to a queue bound to a core of the server 105 which is to process data, or the inverse-hash function.

According to an exemplary embodiment, the processor 450 may calculate a hash value based on an entry mapped with the queue in the server 105 which is to transmit the data. For example, the processor 450 may calculate a hash value in which values in a designated bit range consist of an entry mapped with a queue and values a remaining bit range consists of arbitrary values. For example, the processor 450 may calculate a hash value in which values in a bit range corresponding to a bit range of an entry mapped with the queue in the hash value O that is to be calculated by the server 105 are identical to the entry mapped with the queue in the hash value O, and which values in the remaining bit range are arbitrary values.

According to an exemplary embodiment, the processor 450 may calculate an input value for calculating a source port number, by using the calculated hash value and the inverse-hash function. For example, the processor 450 may calculate an input value for calculating a source port number, by performing a multiplication operation between the inverse-hash function and a specific hash value.

According to an exemplary embodiment, the processor 450 may determine a source port for transmitting data based on the calculated input value. For example, the processor 450 may calculate a source port number by performing an XOR operation between the calculated input value, values corresponding to upper 16 bits of the source IP number, values corresponding to lower 16 bits of the source IP number, values corresponding to upper 16 bits of the destination IP number, values corresponding to lower 16 bits of the destination IP number, and a destination port number of 16 bits.

In operation 707, the processor 450 may control the network interface card 410 to transmit data via the determined source port. For example, the processor 450 may insert information about a destination IP number, a source IP number, a destination port number, and a source port number into a header area of a data packet. The processor 450 may insert information about a key requested by a user into a payload area of the data packet. The processor 450 may control the network interface card 410 to transmit the data packet to the server 105 via the determined source port.

Although not shown in FIG. 7, the processor 450 (for example, a TCP client socket) may transmit a SYN packet so as to set communication connection to the server 105. According to an exemplary embodiment, if the processor 450 receives a SYN ACK packet from the server 105 in response to a SYN packet, the processor 450 may transmit an ACK packet to the server 105. For example, the processor 450 may transmit the SYN packet or the ACK packet to the server 105 by using an inverse-hash function. For example, the processor 450 may determine a source port for transmitting the SYN packet or the ACK packet, by using a destination IP number and a destination port (or a port number) of the server 105 to which the SYN packet or the ACK packet is to be transmitted, a source IP number for transmitting the SYN packet or the ACK packet, and a hash value or the inverse-hash function corresponding to a queue bound to a core of the server 105 which is to process the SYN packet or the ACK packet. The processor 450 may control the network interface card 410 to transmit the SYN packet or the ACK packet via the determined source port.

Figure 8:
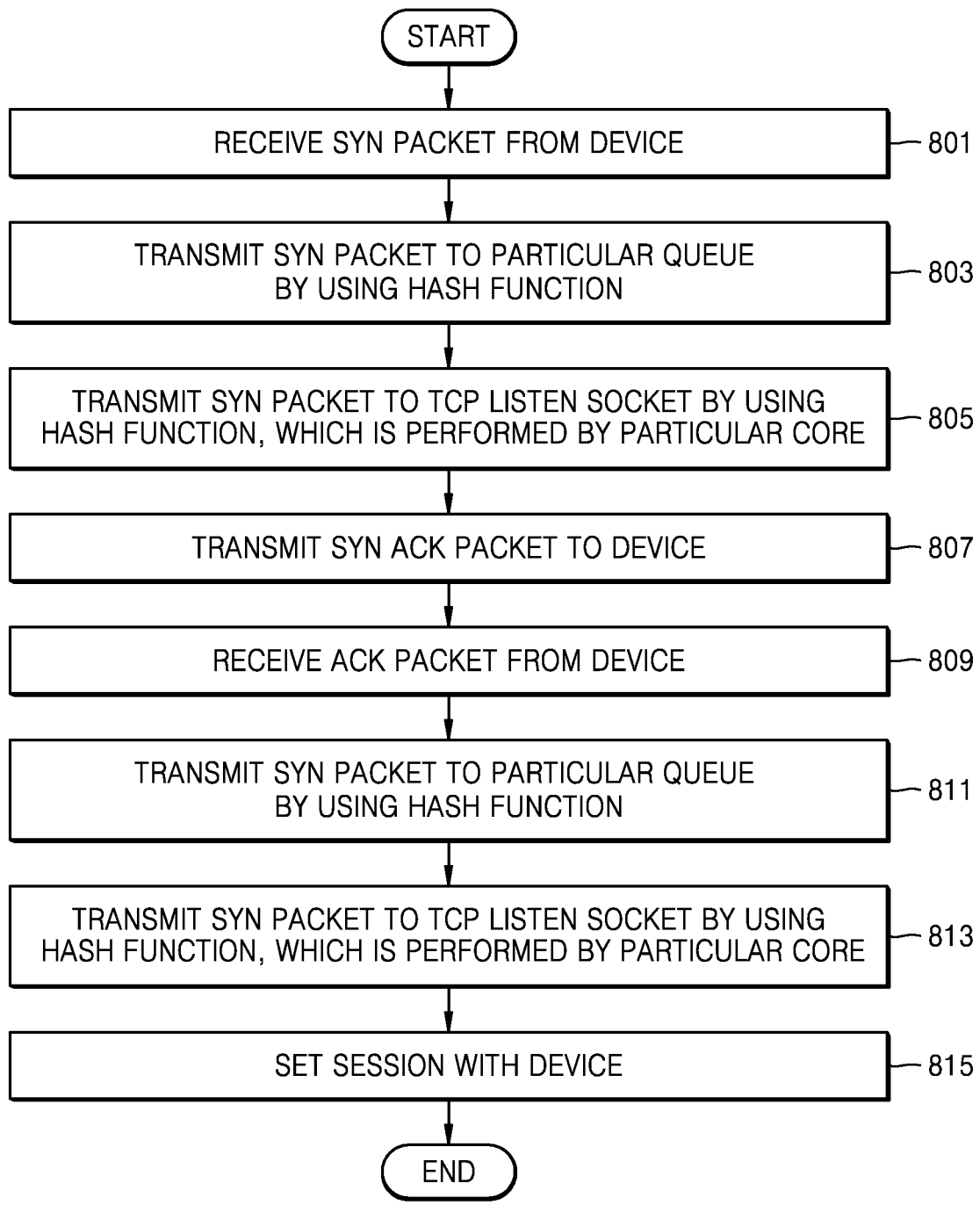
FIG. 8 is flowchart illustrating a method of setting communication connection to the device, which is performed by the server, according to an exemplary embodiment.

FIG. 8 is flowchart illustrating a method of setting communication connection to the device, which is performed by the server, according to an exemplary embodiment.

In operation 801, the server 105 may receive a SYN packet from the device 105. For example, the server 105 (for example, the network interface card 230) may receive a SYN packet from the device 101 via the port 240 of the network interface card 230.

In operation 803, the server 105 (for example, the network interface card 230) may transmit the SYN packet to a particular queue, by using a hash function. For example, the server 105 may determine a queue to which the received SYN packet is to be transmitted, from among the plurality of queues 231 through 235, based on header information included in the received SYN packet. A process of transmitting the SYN packet to a particular queue, which is performed by the server 105, is described with reference to FIG. 6. Thus, a detailed description thereof is not provided here again.

In operation 805, the server 105 (for example, a core) may transmit the SYN packet to a TCP listen socket, by using the hash function. For example, a particular core bound to the queue, determined in operation 803, may receive an interrupt from the queue. The particular core may determine a particular TCP listen socket from among a plurality of TCP listen sockets, by using a destination IP number, a destination port, a source IP number, and a source port number which are included in the SYN packet, and the hash function. The particular core may transmit the SYN packet to the determined particular TCP listen socket. According to an exemplary embodiment, the hash function used by the particular core may be a Toeplitz hash function identical to a hash function used to determine a particular core. According to an exemplary embodiment, the particular core may perform an operation identical to an operation performed by the hash function module 250, the hash masking module 260, and the queue mapping module 270.

In operation 807, the server 105 may transmit a SYN ACK packet to the device 101. For example, the server 105 may transmit the SYN ACK packet to the device 101, via a path identical to a path via which a transmission packet (for example, the SYN packet) is received.

In operation 809, the server 105 may receive an ACK packet from the device 105. For example, the server 105 (for example, the network interface card 230) may receive the ACK packet form the device 101 via the port 240 of the network interface card 230.

In operation 811, the server 105 (for example, the network interface card 230) may transmit the ACK packet to a particular queue, by using a hash function. For example, the server 105 may determine a queue to which the received ACK packet is to be transmitted, from among the plurality of queues 231 through 235, based on header information included in the received ACK packet. A process of transmitting the ACK packet to a particular queue, which is performed by the server 105, is described with reference to FIG. 6. Thus, a detailed description thereof is not provided here again.

In operation 813, the server 105 (for example, a core) may transmit the ACK packet to a TCP listen socket, by using the hash function. For example, a particular core dedicated (or bound) to the queue, determined in operation 803, may receive an interrupt from the queue. The particular core may determine a particular TCP listen socket from among a plurality of TCP listen sockets, by using a destination IP number, a destination port, a source IP number, and a source port number which are included in the SYN packet, and the hash function. The particular core may transmit the ACK packet to the determined particular TCP listen socket. According to an exemplary embodiment, the particular TCP listen socket may be identical to the TCP listen socket that received the SYN packet. According to an exemplary embodiment, the hash function used by the particular core may be a Toeplitz hash function identical to a hash function used to determine a particular core. According to an exemplary embodiment, the particular core may perform an operation identical to an operation performed by the hash function module 250, the hash masking module 260, and the queue mapping module 270, so as to determine a TCP listen socket.

In operation 815, the server 105 may set a session with the device 101. For example, if the TCP listen socket of the server 105 receives the ACK packet, the TCP listen socket may generate a TCP socket, and thus, a session between the server 105 and the device 101 may be set.

As such, according to one or more exemplary embodiments, the method of distributing data and the device may efficiently distribute data by supporting processing requested data, so that a specific core may process the requested data.

As described above, according to the one or more of the above exemplary embodiments, the method of distributing data and the device supporting the same may efficiently distribute data by supporting processing of requested data, so that the specific core may process the requested data.

In addition, other exemplary embodiments can also be implemented through computer readable code/instructions in/on a medium, e.g., a computer readable medium, to control at least one processing element to implement any of the above described exemplary embodiments. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bit stream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A method comprising:
    identifying, by a device, at least one of a core of a computer or a queue of a network interface card (NIC) of the computer corresponding to the core of the computer, from among a plurality of cores of the computer or a plurality of queues corresponding to the cores, the core of the computer being configured to process data transmitted from the device;
    calculating, by the device, a hash value by using an inverse-hash function, which is an inverse function of a hash function used by the computer;
    identifying, by the device, a source port of the device for transmitting data to the identified at least one of the core or the queue of the NIC corresponding to the core of the computer, based on the calculated hash value; and
    transmitting, by the device, data to the computer, via the identified source port,
    wherein the identifying the source port of the device further comprises:
        calculating an input value by performing a multiplication operation between the inverse-hash function and a specific hash value calculated based on an entry mapped with the queue of the NIC corresponding to the core of the computer; and
        identifying the source port based on the calculated input value.

2. The method of claim 1, wherein the identifying the source port comprises:
    identifying a source port number of the source port, based on the calculated hash value, a destination internet protocol (IP) number, a destination port number, and a source IP number.

3. The method of claim 2, wherein the hash value consists of a value mapped with the identified queue of the NIC dedicated to the identified core, from among the queues, which are queues of the NIC, and an additional arbitrary value.

4. The method of claim 3, wherein the identifying the source port number further comprises identifying the source port number by executing an exclusive or (XOR) operation between the calculated hash value, the destination IP number, the destination port number, and the source IP number, by using the inverse-hash function.

5. The method of claim 4, wherein the identifying the source port number further comprises identifying the source port number by executing the XOR operation between values corresponding to upper 16 bits of the source IP number, values corresponding to lower 16 bits of the source IP number, values corresponding to upper 16 bits of the destination IP number, values corresponding to lower 16 bits of the destination IP number, and the destination port number of 16 bits, by using the inverse-hash function.

6. The method of claim 1, wherein the transmitting the data to the computer comprises inserting a destination internet protocol (IP) number, a destination port number, a source IP number, and a source port number, into a header area of a data packet.

7. The method of claim 1, wherein the hash function is a Toeplitz hash function, and is a linear independent matrix.

8. The method of claim 7, wherein a factor included in a row of the linear independent matrix is shifted at an interval of at least one bit, as a number of the row in the linear independent matrix is increased.

9. The method of claim 1, further comprising communicatively connecting to the computer, wherein the communicatively connecting to the computer comprises:
    identifying the source port of the device for transmitting a synchronization (SYN) packet;
    based on a SYN acknowledgement (ACK) packet being obtained from the computer, transmitting an ACK packet to the at least one of the core or the queue of the NIC corresponding to the core by using the inverse-hash function; and
    transmitting the SYN packet and the ACK packet to the computer via the identified source port.

10. An apparatus comprising:
    a network interface card (NIC) configured to receive and transmit data; and
    a processor configured to process the received data, wherein the processor is further configured to:
        identify at least one of a destination core of a computer or a queue of the NIC corresponding to the destination core, from among a plurality of cores of the computer or a plurality of queues corresponding to the cores of the computer, the destination core of the computer being configured to process data transmitted from the apparatus;
        calculate a hash value, by using an inverse-hash function, which is an inverse function of a hash function used by the computer;
        identify a source port of the apparatus which transmits data to the identified at least one of the destination core or the queue of the NIC corresponding to the destination core, based on the calculated hash value, and
        control a transmission of the data to the computer via the identified source port,
    wherein the identifying the source port of the apparatus further comprises:
        calculating an input value by performing a multiplication operation between the inverse-hash function and a specific hash value calculated based on an entry mapped with the queue of the NIC corresponding to the destination core of the computer; and
        identifying the source port based on the calculated input value.

11. The apparatus of claim 10, wherein the processor is further configured to identify a source port number of the identified source port, based on the calculated hash value, a destination internet protocol (IP) number, a destination port number, and a source IP number.

12. The apparatus of claim 11, wherein the hash value consists of a value mapped with the queue of the NIC corresponding to the destination core, which is dedicated to the destination core, from among the plurality of queues of the NIC, and an arbitrary value.

13. The apparatus of claim 12, wherein the processor is further configured to identify the source port number by performing an exclusive or (XOR) operation between the calculated hash value, the destination IP number, the destination port number, and the source IP number.

14. The apparatus of claim 13, wherein the processor is further configured to identify the source port number by performing an XOR operation between values corresponding to upper 16 bits of the source IP number, values corresponding to lower 16 bits of the source IP number, values corresponding to upper 16 bits of the destination IP number, values corresponding to lower 16 bits of the destination IP number, and the destination port number of 16 bits.

15. The apparatus of claim 10, wherein the processor is further configured to insert a destination internet protocol (IP) number, a destination port number, a source IP number, and a source port number, into a header of a data packet.

16. The apparatus of claim 10, wherein the hash function is a Toeplitz hash function, and is a linear independent matrix.

17. The apparatus of claim 16, wherein a factor included in a row of the linear independent matrix is shifted at an interval of at least one bit, as a number of the row in the linear independent matrix is increased.

18. The apparatus of claim 10, wherein the processor identifies the source port of the apparatus for transmitting a synchronization (SYN) packet, based on a SYN acknowledgement (ACK) packet obtained from the computer, transmits an ACK packet to the at least one of the destination core or the queue of the NIC by using the inverse-hash function, so as to communicatively connect to the computer, and controls the NIC to transmit the SYN packet or the ACK packet to the computer via the identified source port.

19. The method of claim 1, wherein the hash value and another hash value have a portion with identical values which identify the entry mapped with the identified queue of the NIC corresponding to the identified core of the computer.

20. The method of claim 1, further comprising:
obtaining, by the device, an input from a user;
extracting, by the device, a value of a key based on the obtained input;
generating a data packet comprising a header and a payload, wherein the payload comprises the data which is the value of the key and the header comprises information regarding the identified source port of the device, a source internet protocol (IP) number, a destination port number, and a destination IP number.

21. The method of claim 1, wherein the identifying, by the device, the source port further comprises identifying a source port number of the source port number by executing an exclusive or (XOR) operation between the calculated hash value, a predetermined portion of a destination internet protocol (IP) number, a destination port number, and another predetermined portion of a source IP number, by using the inverse-hash function.

22. The method of claim 1, wherein the identifying, by the device, the source port further comprises: identifying a source port number of the source port number by executing an XOR operation between first values corresponding to an upper portion of a source internet protocol (IP) number comprising a first predetermined number of bits, second values corresponding to a lower portion of the source IP number comprising a second predetermined number of bits, third values corresponding to the upper portion of a destination IP number of the first predetermined number of bits, fourth values corresponding to the lower portion of the destination IP number comprising the second predetermined number of bits, a destination port number, and a calculated input value.

* * * * *